Inventor:
Ellsworth J. Hanna
By Munday, Clarke & Carpenter Attys

April 8, 1924.

E. J. HANNA 1,489,245

PROCESS OF MOLDING CAR WHEELS

Filed Oct. 3, 1921

Inventor:—
Ellsworth J. Hanna
By:—Munday, Clarke & Carpenter
Atty's

Patented Apr. 8, 1924.

1,489,245

UNITED STATES PATENT OFFICE.

ELLSWORTH J. HANNA, OF OTTUMWA, IOWA, ASSIGNOR TO OTTUMWA IRON WORKS, OF OTTUMWA, IOWA.

PROCESS OF MOLDING CAR WHEELS.

Application filed October 3, 1921. Serial No. 505,081.

*To all whom it may concern:*

Be it known that I, ELLSWORTH J. HANNA, a citizen of the United States, residing in Ottumwa, in the county of Wapello and State of Iowa, have invented a new and useful Improvement in Processes of Molding Car Wheels, of which the following is a specification.

This invention relates in general to a process of molding car wheels and the like, and among its principal objects are the elimination of the use of a metal pattern in the mold, a reduction and simplification of the operations necessary in completing the mold, and the elimination of a large proportion of the physical exertion heretofore required under the methods employed in producing articles of this character.

In the machine molding of car wheels it is essential to use a chill in the drag part of the mold in order that the rim of the wheel may be suitably chilled to insure long wear. This part is, of necessity, very heavy and its handling requires extraordinary physical exertion which constitutes a considerable portion of the labor involved in this type of manufacturing. Under the usual methods a metal pattern is placed in the chill and before the mold is completed the latter must be lifted and its position changed several times. My invention contemplates the elimination of the manual handling of the chill and the substitution of mechanical means for accomplishing this purpose, as well as the provision of a process of molding which requires less and more simple apparatus than has heretofore been required, and effects a material saving in the time involved in completing the mold.

A further object of the invention is the provision of a process for the purpose stated, in which the use of a chill during the normal ramming operation, involved in forming the mold, is made unnecessary, thereby greatly reducing the number of times which the chill must be handled, as well as dispensing with its weight upon the jolting or ramming machine.

Numerous other objects and advantages of the invention will be apparent as it is better understood from the following description, which, taken in connection with the accompanying drawings, discloses a preferred embodiment thereof.

Referring to the drawings.

Figure 1:
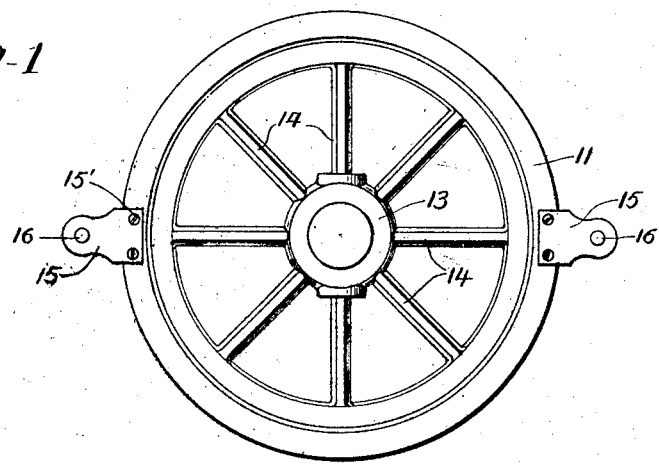
Figure 1 is a plan view of a green sand core box used in carrying out my invention.
Figure 2:
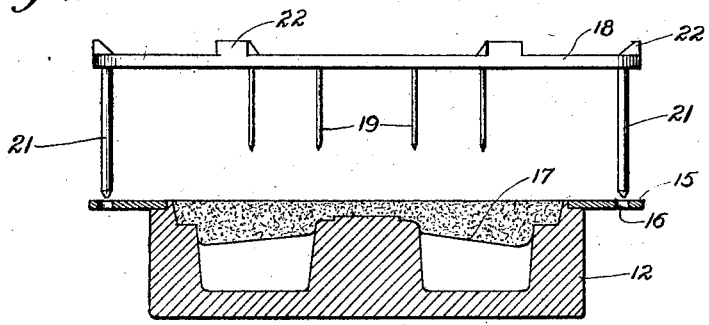
Fig. 2 is a vertical section taken through the partially filled core box and the inverted metal core-supporting member, shown for purposes of illustration, in its position just prior to insertion in the core box.

Upon the drawings which form an illustrative embodiment of my invention, I have shown in Fig. 1, a green sand core box 11, preferably constructed of wood, and having a body part 12 provided with a central hub-shaped part 13 and core-forming partitions 14 radiating from said part 13. Secured by screws 15' to the edges of the top or open side of the core box are projections or lugs 15 which are bored at 16 for a purpose which will become apparent as the description progresses. The first step in the process which I have provided consists in positioning the core box 11, with its open side up, upon a mechanical jolt ramming machine, after which it is filled with green sand and given a few jolts by the machine which may be operated by compressed air or in any preferred manner. This sets the sand and forms a core 17 between the boss or hub-shaped part 13 and the partitions 14.

A metal core support 18 is next placed upon the core box in inverted position, this member being provided with nails 19 adapted to be inserted in the core, and at its outer edge with larger nails or posts 21 which, when the support is pressed home, extend through the bored parts 16 of the lugs 15. The unit, formed as just described, is then turned over and the core box removed, leaving the core supported upon the member 18 which has legs 22 adapted to rest upon the foundry floor.

Figure 3:
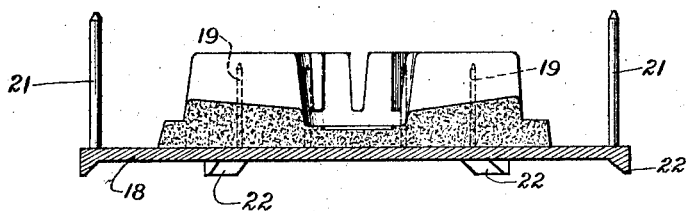
Fig. 3 is a vertical section of the core and its metal support after removal of the core box and shown in inverted position with respect to that shown in Fig. 2.
Figure 4:
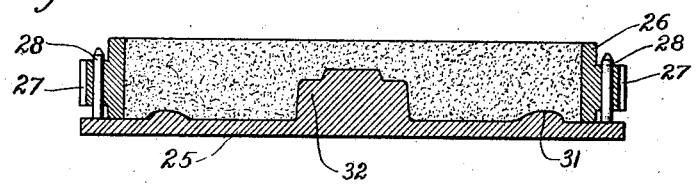
Fig. 4 is a vertical section of the filled cope just subsequent to its being rammed in a jolt ramming machine.
Figure 5:
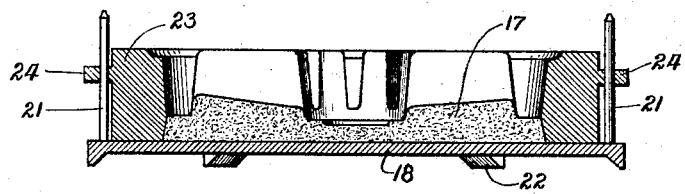
Fig. 5 is a vertical section similar to that shown in Fig. 3, and showing the chill positioned to form, with the other parts, the drag portion of the mold.

A chill 23, which it will be observed, is not employed in the formative operation upon the core, is next lifted by a compressed air or electric hoist and positioned upon the parts shown in Fig. 3. This chill, as seen in Fig. 5, is provided with lugs 24 which are bored to receive the posts 21 which hold the chill in place about the core 17.

Figure 6:
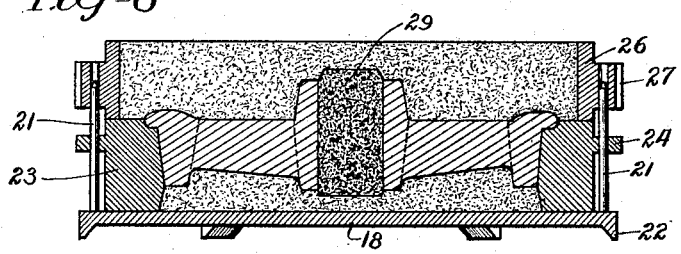
Fig. 6 is a vertical section of the mold completed and ready to pour, the center core of the wheel being shown in position for the pouring operation.

The next step is to place a pattern member 25 upon the jolt ramming machine, after which a flask 26 is placed thereon and filled with sand. It will be noted that the flask has bored projections 27 which fit upon posts 28 extending upwardly from near the edges of the pattern member 25. The ramming of this unit sets the sand about the pattern member, forming the top of the cope or upper part of the mold. The unit is then rolled over and the pattern member removed, leaving the cope ready for positioning upon the drag or lower portion of the mold, as shown in Fig. 6. Prior to so positioning this member, however, the center core 29 of the wheel is placed in the center of the mold and when the parts are assembled, as shown in said Fig. 6, said mold is completed and ready for pouring. It will be observed that the pattern member 25 has an annular raised portion 31 and a hub-shaped part 32 whereby the desired contour of the cope is obtained. With the mold so formed, the pouring and finishing of the wheel are accomplished in the usual and well known manner.

It will be apparent from the foregoing that the core box which is shown as of wood, but which of course may be constructed of metal if desired, takes the place of the metal pattern employed in other processes. The entire formative operation requires only the use of this part, and the heavy chill, which it may be mentioned must necessarily weigh from 250 to 350 lbs. even for small wheels, is left upon the foundry floor and does not have to be moved during this operation. After the core is finished the chill is lifted by mechanical means and positioned upon the support for the core, where it remains during the remainder of the process, requiring no manual handling whatever since it is not used in forming the core upon the ramming machine or for any purpose except that for which it is actually required, namely, the chilling of the rim of the wheel. In this manner the molding of wheels may be accomplished with much less physical exertion than has heretofore been required, and at the same time, the process is simplified and rendered highly efficient.

While, in the embodiment of the invention, herein described, the apparatus shown is adapted for the manufacture of comparatively small wheels for mining and industrial cars, it is obvious that my process is equally applicable to the manufacture of railway car wheels or wheels of any other type on which a chilled rim is required.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A process of molding car wheels and the like, which consists in forming a core in a core box of relatively light material and separate from the drag, removing the core therefrom to a supporting member, mechanically positioning a chill about said core and upon said support, inserting the center core of the wheel, forming a cope and positioning the same upon said parts, and pouring the mold.

2. A process of molding car wheels and the like, which consists in forming a core in a core box without the use of a metal pattern, removing the core box, forming a mold about the finished core and molding the wheel therein.

3. A process of molding car wheels and the like, which consists in forming a core in a core box without the use of a metal pattern, removing the core box, forming a mold about the finished core and molding the wheel therein, said mold including a chill.

4. A process of molding car wheels and the like, which consists in filling a core box with green sand, jolting the box to set the sand and form a core, removing the core from said box, completing a mold, including a chill member, about said core, and pouring the mold.

5. A process of molding car wheels and the like, which consists in filling a core box with green sand, jolting the box to set the sand and form a core, removing the core from said box, mechanically positioning a chill about said core, completing a mold including said core and chill, and pouring the mold.

6. A process of molding car wheels and the like, which consists in forming a core in a core box of relatively light material, removing the core, mechanically positioning a chill thereabout, and completing a mold including said core and chill.

ELLSWORTH J. HANNA.